June 9, 1925.
M. ELONEN
1,541,254
RUNNING BOARD SADDLE FOR BOX CARS
Filed April 13, 1925
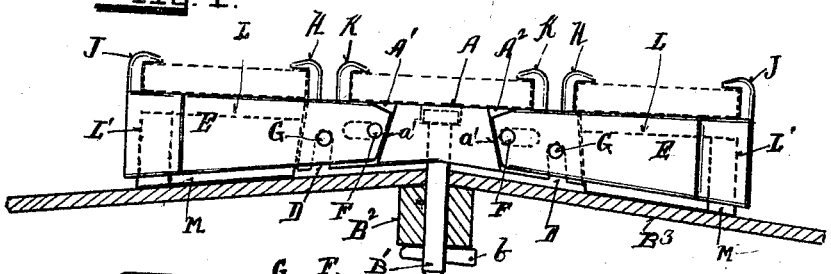
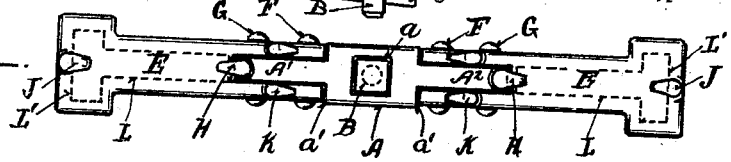
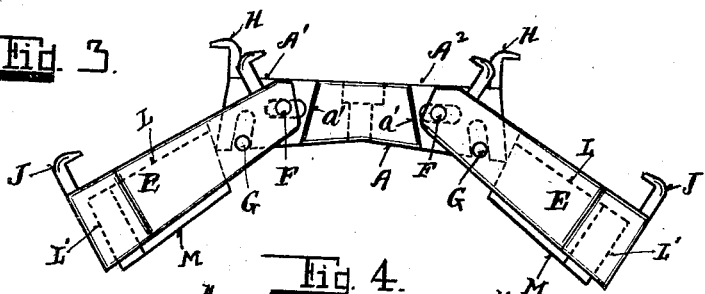
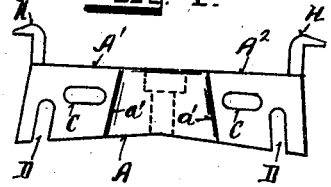
Inventor.
Mathew Elonen Patented June 9, 1925.

1,541,254

UNITED STATES PATENT OFFICE.

MATHEW ELONEN, OF CONNEAUT, OHIO.

RUNNING-BOARD SADDLE FOR BOX CARS.

Application filed April 13, 1925. Serial No. 22,839.

*To all whom it may concern:*

Be it known that I, MATHEW ELONEN, a citizen of the United States, residing at Conneaut, in the county of Ashtabula and State of Ohio, have invented certain new and useful Improvements in Running-Board Saddles for Box Cars; and I do hereby declare the following to be a full, clear, and exact description of the invention, such as will enable others skilled in the art to which it appertains, to make and use the same, reference being had to the accompanying drawings, and to the letters of reference marked thereon, forming part of this specification.

My invention relates to running board saddles adapted to secure running boards to car roofs.

The objects of my invention are to do away with wooden saddles which have to be nailed upon car roofs, thereby avoiding decay, and consequent repairs. To provide a running board saddle which will securely clamp running boards thereto when secured upon a car roof. To provide a running board with but a single fastening to secure it to a car roof whereby the saddle will be caused to securely clamp the running boards in place.

These and other features of my invention will appear hereinafter, and are illustrated in the accompanying drawings, in which:

Figure 1 is a side elevation of my improved running board saddle in place upon a car roof, showing running boards in place thereon by broken lines.

Figure 2 is a plan view of the same.

Figure 3 is a side view of the same in position to receive the running boards.

Figure 4 is a side elevation of the intermediate portion of the same.

In these drawings A indicates the intermediate portion of my improved running board saddle, which is provided with a vertical opening through the central portion thereof, shown by broken lines, which opening is provided with a recessed upper end, $a$, see Fig. 2, to receive the head B of a bolt B′ to pass down through the ridge timber B² of the car roof B³ where it is secured preferably by means of a key $b$, passing through a slot in said bolt under the ridge timber B².

The intermediate portion A, of the saddle is provided with lateral extensions A′ and A² which are thinner than the intermediate portion A, which terminate in shoulders $a'$. The thin extensions A′ and A² are provided with horizontally elongated openings C, and with slots D. Upon the extensions A′ and A² are hinged bifurcated end portions E which embrace the thin extension A′ and A², pivot pins F passing therethrough and through the horizontally elongated openings C in said extensions A′ and A² so that said end portions E can swing on said pins F as shown in Fig. 3. Transverse pins G pass through the bifurcated portions of said parts E and through said open slots D in the extensions A′ and A², and when the saddle is in the position shown in Fig. 1, engage the upper ends of the slots D, causing the pivote pins F to move toward the shoulders $a'$ until the ends of the end portions E engage said shoulders, as shown in Fig. 1.

The intermediate portion of the saddle is provided with upwardly extending lugs H having outwardly bent hooks adapted to embrace a running board, which are located upon the ends of the thin extensions A′ and A², while the end portions E are provided with like lugs J located upon the extreme ends thereof, and with like lugs K located on the bifurcated portion of said end portions E, the lugs J and K having hooked upper ends turned toward the lugs H, so that the lugs K, K, on the end portions E, E, swing away from each other, and the lugs J, J, swing a way from the lugs H, H, when the saddle is in the position shown in Fig. 3, ready to receive running boards, which will be securely clamped between said lugs when the saddle is straightened out upon the roof of a car, as indicated by broken lines in Fig. 1, with the bolt B′ passing downwardly through the ridge timber B² of a car.

When it is desired to remove the running boards, for any reason, the fastening of the bolt B′, of each saddle, is removed and the length of boards lifted upward, which brings the saddles to the position shown in Fig. 3, and the boards removed. Thus the entire running board structure is secured upon the roof of a car by means of the ridge timber bolts, without other fastenings.

In the drawings the broken lines L and L′ indicate inverted channels cored out of the under sides of the end portions E of the saddle in which wooden blocks M are placed which are preferably used when the saddle is placed on metal roofed cars. While these wooden blocks are preferred for use on iron roofs, they are not absolutely necessary for the operation of the saddle, as hereinbefore described.

Having thus fully shown and described my invention so that others can utilize the same, the operation thereof will be obvious to those skilled in the art, and further description will be unnecessary. Therefore, I do not desire to limit myself to the exact construction and arrangement shown and described, as many modifications can be made therein without departing from the scope of my invention, but what I claim as new and desire to secure by Letters Patent is:

1. In a device of the class described, a plurality of base portions articulated on each other, and upwardly projecting lugs on said base portions adapted to clamp running boards between them when said base portions are in position with their upper surface in a straight line.

2. In a device of the class described, an intermediate portion, upwardly projecting lugs on the ends thereof, end portions pivoted on said intermediate portion, upwardly projecting lugs on said end portions adapted to oppose the lugs on said intermediate portion and lugs on opposite end portions.

3. In a device of the class described, an intermediate portion, upwardly projecting lugs on the ends thereof, end portions pivoted on said intermediate portion, upwardly projecting lugs on the outer ends of said end portions adapted to oppose the lugs on said intermediate portion, and upwardly projecting lugs on the inner ends of said end portions adapted to oppose each other.

4. In a device of the class described, an intermediate portion having a vertical opening therethrough, a bolt in said opening adapted to secure said portion in place, upwardly projecting lugs on said intermediate portion, end portions articulated on said intermediate portion, upwardly projecting lugs on the outer ends of said end portions, and upwardly projecting lugs on the inner ends of said end portions.

5. In a device of the class described, an intermediate portion having longitudinally and vertically slotted openings therein, end portions, pins secured in said end portions and passing through said slotted openings, whereby said end portions are articulated upon said intermediate portion, and upwardly projecting lugs on each of said portions adapted to clamp running boards between them.

In testimony whereof I affix my signature.

MATHEW ELONEN.